March 19, 1974  E. V. MENDENHALL  3,798,097
METHOD OF MAKING BRANCHED PLASTIC CONDUIT
Filed March 23, 1972  2 Sheets-Sheet 1
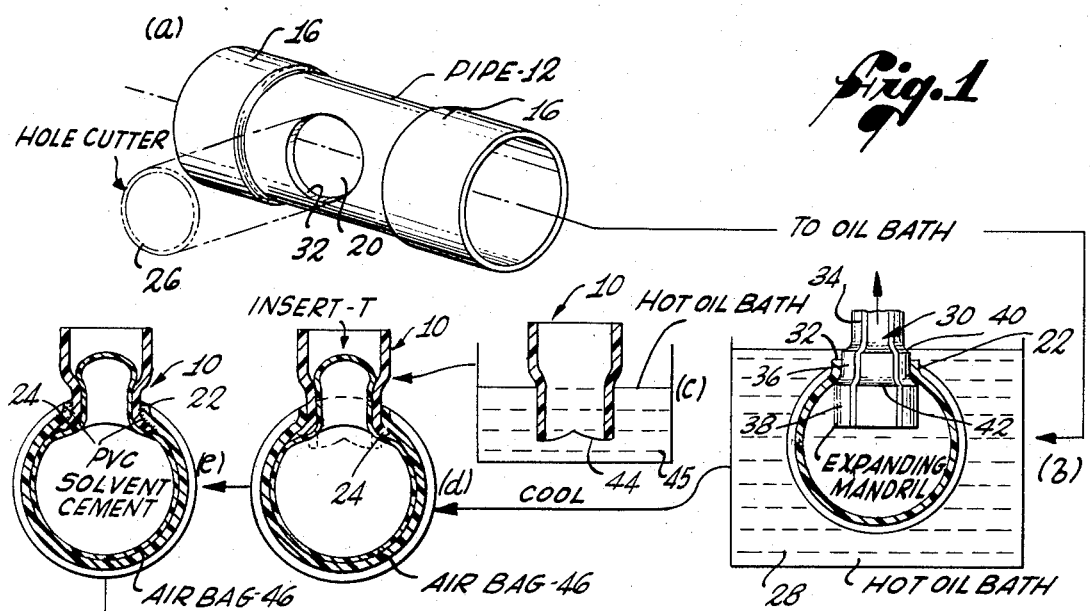
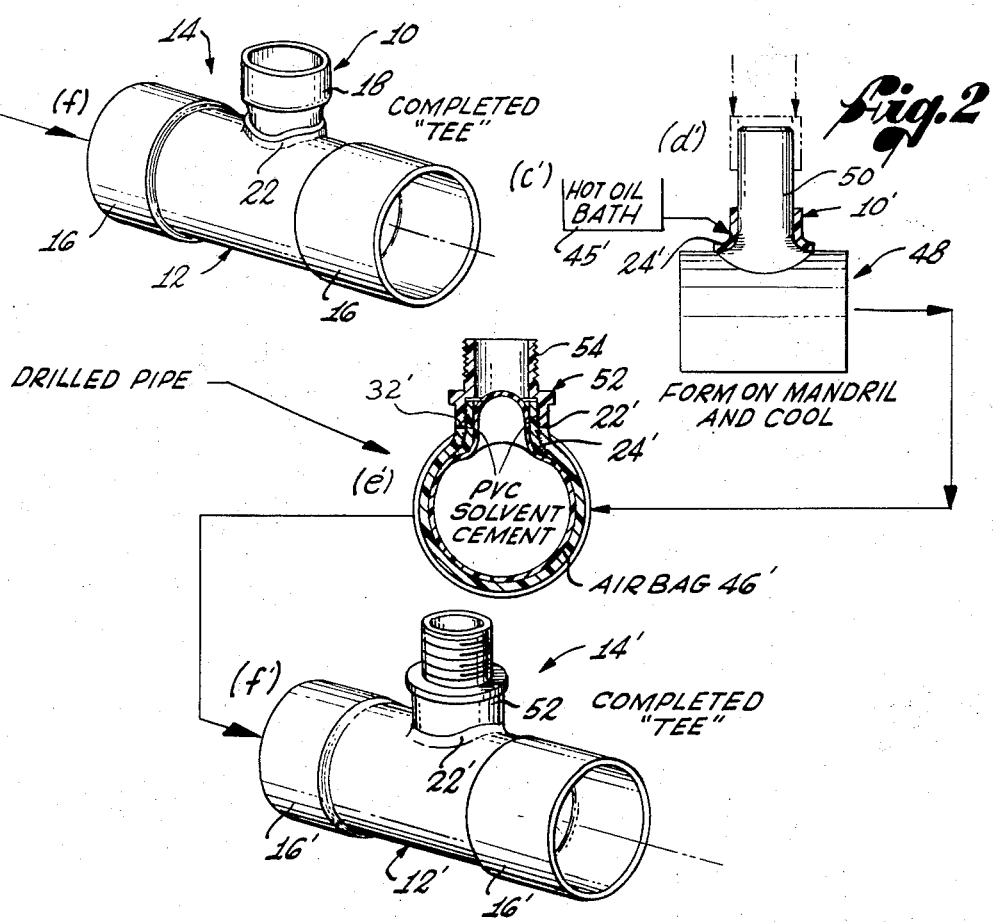

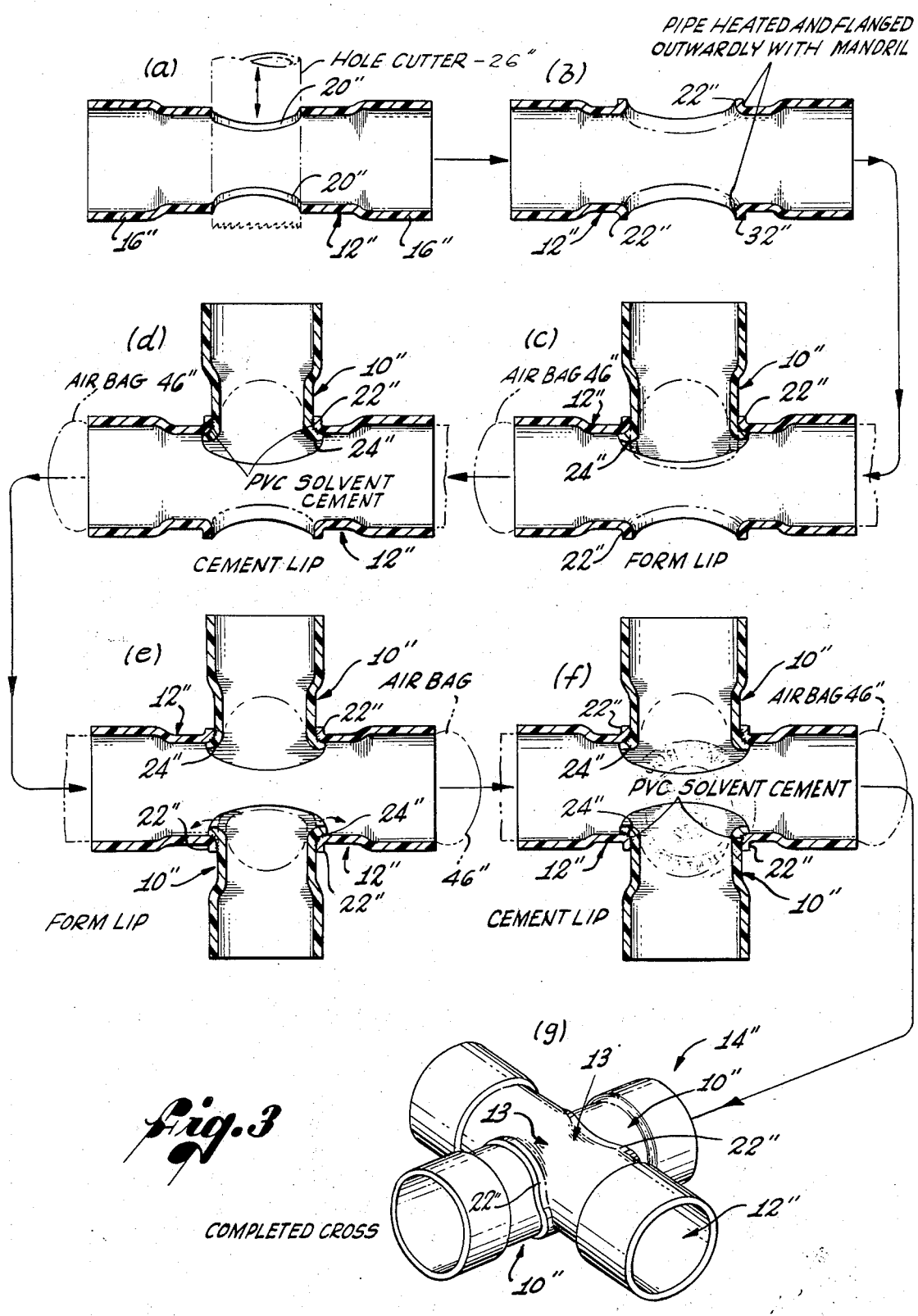

United States Patent Office 3,798,097
Patented Mar. 19, 1974

3,798,097
METHOD OF MAKING BRANCHED PLASTIC CONDUITS
Edward V. Mendenhall, P.O. Box 2026, Oxnard, Calif. 93030
Filed Mar. 23, 1972, Ser. No. 237,484
Int. Cl. B29c 17/00
U.S. Cl. 156—152                               22 Claims

ABSTRACT OF THE DISCLOSURE

A method of joining a plastic tube to the side of a plastic pipe to form a branched conduit by making a hole in the side of the pipe smaller than the tube, softening the area around the hole and expanding the hole to a size sufficient to receive one end of the tube while forming an upstanding flange around the hole, forming a radial lip on the end of the tube and bonding the tube to the pipe with the lip engaged with the inside of the pipe around the hole and the flange engaged around a portion of the outside of the tube. In one embodiment, a "T" conduit is formed by deforming the tube to form the lip while one end portion of the tube is in position in the hole, and in a second, the lip is formed prior to insertion of the tube in the hole. In a third embodiment, a "cross" conduit is formed by deforming the ends of two tubes in two axially aligned holes in the sides of the pipe.

BACKGROUND OF THE INVENTION

This invention relates to methods for joining plastic pipes and tubes, and has particular reference to a method for joining a plastic tube to the side of a plastic pipe to form a branched fluid conduit.

Often it is not possible or practical to mold or otherwise form a thermoplastic material into a single-piece branched conduit such as a "T," "Y" or "cross." For example, in relatively large diameter pipe, say from 6 inches to 40 inches in diameter, the molding of single-piece branched sections is prohibitively expensive due to the high cost of molding equipment. Consequently, it is necessary to form branched sections by joining pieces of pipe together.

The joining of plastic pipes to form a branched conduit section has heretofore caused considerable concern since the joints are usually the weakest part of a conduit system and deteriorate more rapidly than the plastic pipes themselves. Typically, two or more pieces of plastic pipe are joined together simply by welding or bonding one piece to the other using a butt, fillet, or lap weld. Such welds, however, introduce detrimental stresses into the materials around the weld causing rapid deterioration of the joint when the conduit is used.

Lap bonding has also been used with little success. In forming a "T" branch, for example, the branch tube is often formed with a flared end which is lap bonded to the outside of the main pipe. This type of joint, however, has experienced a relatively high failure rate, this apparently being due to internal radial pressures in the tube acting on the joint in such a way as to peel the flared end away from the pipe. As a result, it has been necessary to over design the branched sections and to reinforce the joints, causing the branched sections to be expensive and difficult to make.

SUMMARY OF THE INVENTION

The present invention provides a simple, inexpensive, and reliable method of joining a plastic tube to the side of a plastic pipe to form a branched conduit in such a manner that the joint between the tube and pipe is extremely strong and is capable of maintaining its integrity even when exposed to internal fluid pressures approaching the maximum limits of the tube or pipe alone.

More specifically, the branched conduit is made by initially forming an undersized hole in the side of a pipe and then softening the pipe and expanding the hole incident to forming an upstanding flange around the hole, the hole being expanded to a size sufficient to receive one end of a tube which forms the branch. One end of the tube is deformed to define a lip which will conform to the contour of the inside of the pipe and surround the hole. The tube is positioned in the pipe with the lip engaged around the hole and the flange surrounding the tube, and then is bonded to the pipe by bonding the lip to the pipe and the flange to the tube.

In one embodiment, a "T" conduit is formed by deforming the tube while in position in the pipe, and in a second, the lip is formed prior to inserting the tube into the expanded hole. In a third embodiment, a "cross" conduit is formed by deforming two axially aligned tubes projecting from opposite sides of the pipe while the end portions of the tubes are in position in flanged holes in opposite sides of the pipe.

Other features and advantages of the invention will become apparent from the following detailed description taken in conjunction with the drawings which illustrate, by way of example, the principles of the invention.

DESCRIPTION OF THE DRAWINGS

FIG. 1 is a schematic diagram, partly in perspective and partly in cross-section, representing the steps in the method of the invention as used to form a "T" conduit fitting;

FIG. 2 is a schematic diagram, partly in perspective and partly in cross-section, representing another mode of the method as used to form another "T" conduit fitting; and FIG. 3 is a schematic diagram, partly in perspective and partly in cross-section, representing the steps of the method as used to form a "cross" conduit fitting.

DETAILED DESCRIPTION

As shown in the exemplary drawings, the present invention resides in a method of joining a plastic tube 10 to the side of a plastic pipe 12 to make a branched conduit 14 for use in a fluid flow system. In this instance, the conduit 14 takes the form of a connector fitting to which additional conduit sections can be attached, and the tube 10 and pipe 12 are both formed of polyvinyl chloride (PVC), although the method of the invention can be used with pipes or tubes made of any high strength thermoplastic material.

In the branched conduit formed by the method illustrated in FIG. 1, the tube 10 projects laterally from the side of the pipe 12 so that the conduit 14 has the form of a "T" fitting. The pipe 12 herein has a circular cross-section with belled end portion 16 formed by enlarged diameter end portions, and the tube 10 is similarly cylindrical with a circular cross-section of smaller diameter than the pipe, and has a belled or enlarged diameter end portion 18 into which the end portion of another conduit section (not shown) can be inserted and secured.

In accordance with the invention, the branched conduit 14 is made by forming a hole 20 in the side of the pipe 12 smaller than the size of the tube 10, forming a flange 22 around the hole while enlarging the hole to a size sufficient to receive the tube, inserting one end portion of the tube into the hole, deforming the one end of the tube within the pipe to form a lip 24 abutting the inside of the pipe around the hole, and bonding the flange to the tube and the lip to the pipe. By virtue of the method, the joint between the pipe 12 and tube 10 is extremely strong and will not fail or deteriorate even when exposed to internal pressures approaching the maximum limits of the pipe or tube alone.

More particularly, and referring to illustration (a) of FIG. 1, the hole 20, which can be formed in any suitable manner, herein is made by using a circular knife-edge or sawtooth-edge cutter 26. The cutter 26 is selected to have a size which will form a hole having a diameter substantially less than the outer diameter of the end portion of the tube 10 to be inserted through the hole. After the hole 20 has been formed, the area around the hole is softened and the flange 22 is formed.

As seen in illustration (b), the area around the hole 20 herein is softened by immersing the pipe 12 in a heated liquid bath 28 which raises the temperature of the plastic to a point at which it can be easily deformed. Any suitable liquid which is capable of being safely heated to a temperature high enough to soften the plastic of the pipe and which will not chemically attack the pipe can be used for the bath. For example, a glycerine oil bath raised to a temperature of about 300° F. will sufficiently soften the PVC pipe 12 in several minutes to allow plastic deformation to take place around the hole 20.

In this instance, the flange 22 is formed by an expanding mandril 30 which enlarges the hole 20 and simultaneously raises the rim 32 of the hole. The mandril 30, as herein shown in fragmentary elevation, has three interconnected cylindrical sections 34, 36 and 38 of progressively increasing diameters as viewed from top to bottom in FIG. 1. The middle section 36 is connected to the upper section 34 by an inwardly tapered shoulder 40 and to the lower section 38 by a tapered shoulder 42, all of the sections being expandable simultaneously by conventional means not shown here.

The mandril 30 is initially inserted through the hole 20 into the pipe 14 in contracted condition, is positioned with the upper section in the hole, and then is expanded so that the middle section 36 has a diameter substantially equal to or slightly larger than the outside diameter of the end portion of the tube 10 to be inserted in the hole. When thus expanded, the mandril 30 is withdrawn a short distance through the hole 20, the upper shoulder 40 forcing the rim 32 of the hole to rise and expand to form the flange 22. Withdrawal of the mandril 30 continues until the lower shoulder 42 abuts against the inner surface of the pipe 12 around the hole 20, which now is expanded to the diameter of the middle section 36.

The flange 22 then is cooled by removing the pipe 14 from the bath 28 with the expanded mandril 30 in place. After the flange 22 has cooled sufficiently to retain its shape, the mandril 30 is retracted and removed. Due to the circular cross-section of the pipe 14, the resultant flange 22, as viewed from the front side of the pipe shown in illustration (f) of FIG. 1, has a saddle-shaped end surface and is joined to the pipe by relatively sharp, ninety-degree bends at the right and left, and by shallower bends at the front and rear.

After the hole 20 is enlarged and the flange 22 is formed, the tube 10 is inserted, formed with a lip 24, and joined to the pipe. To form the lip 24 without cracking or over-stressing the plastic of the tube 10, the end portion of the tube to be inserted in the pipe 12 is formed with a pair of diametrically opposed, generally V-shaped notches 44 (illustration (c) of FIG. 1), only one of which is shown. The notched end portion is softened in a hot bath 45, typically the same bath used to soften the pipe 12, by heating it to a temperature at which it becomes readily pliable, and then is pressed into the flange 22 and the hole 20 with the notches 44 spaced apart longitudinally of the pipe 12 and inside the latter. When in this position, the end portion inside the pipe 12 is flared outwardly and into engagement with the inside of the pipe around the hole 20, thus forming the lip 24.

In this instance, flaring of the tube 10 is accomplished by an expandable and flexible gas bag 46 which is inserted into the pipe 12 through one end and then expanded. The bag 46, herein composed of rubber, is expanded by air from a suitable compressed air source (not shown), and expands both radially and axially within the pipe 12. Since the bag 46 is free to expand into the passage through the tube 10, it expands and balloons upwardly therein, as seen in illustration (d) of FIG. 1. When expanded, the bag exerts pressure on the end portion of the tube 10 inside the pipe 12 and deforms the end portion laterally of the tube and into engagement with the inside of the pipe.

During such deformation, the longitudinally aligned notches 44 permit the end portion of the tube to be deformed into a substantially uniform annular lip 24 around the hole 20. Due to the saddle-shaped contour of the flange 22 around the hole 20, excessive stretching and stressing of the end portion during deformation could result without the notches 44 in the end of the tube 10, due to the greater stretching of plastic longitudinally of the pipe. The notches 44, however, permit the edge portion to be deformed substantially uniformly into a saddle-shaped contour matching that of the area around the hole 20, and to do so without excessive stretching.

When inflated, the bag 46 also exerts radial pressure on the portion of the tube 10 surrounded by the flange 22 and presses the tube radially into a snug friction fit with the flange. In this manner, the tube 10 is deformed while in the pipe 12 to form the internal lip 24 and provide a tight fit with the inside of the pipe and with the flange 22. Once the lip has been formed, the inflated bag 46 is kept in place until the tube 10 has hardened sufficiently in the deformed condition to retain its shape.

To secure the tube 10 and the pipe 12 together after formation of the lip 24, the bag 46 is deflated and the tube is pushed into the pipe a distance sufficient to expose the upper surface of the lip and the portion of the tube previously surrounded by the flange 22. A coating of suitable solvent cement or bonding material then is applied by brushing or spraying on these exposed surfaces, and the tube 10 is repositioned with the lip 24 engaged with the pipe 12 around the hole 20. Herein, PVC solvent cement is used and, where applied, melts the plastic of the tube 10 and also the abutting portions of the pipe 12, causing the interfacing surfaces to flow together and coalesce.

One typical PVC solvent cement which has been found satisfactory comprises 75% solvent and 25% PVC dissolved in the solvent. To insure that a void-free bond or weld is made, it is necessary that the melted portions of the tube 10 and of the pipe 12 be pressed together as tightly as possible to squeeze out any excess solvent which could evaporate and cause bubbles. In this instance, as shown in illustration (e), pressure is applied by reinflating the bag 46 to press the lip 24 tightly against the pipe 12 and the tube 10 against the flange 22. The bag 46 is maintained in the inflated condition until the solvent has evaporated and the bond is complete. Thereafter, the bag 46 is deflated and removed from the pipe 12, thereby forming the completed conduit 14 shown in illustration (f).

With the lip 24 inside of the pipe 12 and the flange 22 extending around the outside of the tube 10, the joint is extremely strong, and when the conduit 14 is in use, fluid pressures actually work to keep the joint together. Fluid pressure in the pipe 12 exerts radial forces which act on the lip 24 to press it against the inside of the pipe, while fluid pressure in the tube 10 acts radially to press the tube against the flange 22, thus acting to keep the joint surfaces pressed against each other.

Characteristics of a PVC solvent bond are exceptional strength in shear, and weakness in tension. By reason of the joint design, any axially directed forces on the tube 10, for example such as may be caused by "water hammer," act primarily in shear on the joint with the result that the shear strength of the bond is used to maximum effectiveness.

An alternative method of deforming the end portion of the tube 10 for joining to the pipe 12 to form a "T" conduit 14' is shown in FIG. 2, parts of this mode which correspond with parts described above in connection with FIG. 1 being designated by corresponding primed reference numerals. For simplicity, the steps of forming the flanged hole in the pipe 12' have been omitted as they correspond with illustrations (*a*) and (*b*) of FIG. 1. In this instance, rather than inserting a tube into the flanged hole of the pipe 12' and then forming the lip 24', the lip is formed before insertion, this method being usable when the tube is sufficiently short, compared to the diameter of the pipe, that it can be inserted through the hole from the inside of the pipe.

Referring to illustrations (*c'*) and (*d'*) of FIG. 2, the notched end portion of a tube 10' first is heated in a hot bath 45' to the desired working temperature, and then is pressed against the side of a cylindrical mandril 48 having an outer diameter substantially equal to the inner diameter of the pipe 12' in the area of the hole, and a cylindrical projection 50 which extends laterally from the side of the mandril. The projection 50 has a circular cross-section with a diameter slightly less than the inside diameter of the tube 10'.

When the tube 10' is slipped over the projection 50 and pressed against the side of the mandril 48, the lower end of the tube is deformed outwardly to form the lip 24'. Since the diameter of the mandril 48 is the same as that of the inside of the pipe 12', the resultant lip 24' has a saddle-shaped contour which will match with the contour of the inside of the pipe in the area around the hole 20'.

After the lip 24' has sufficiently cooled, the tube 10' is removed from the mandril 48 and the lip and the area of the tube which will be surrounded by the flange 22' are coated with PVC solvent cement. As shown in illustration (*e'*), the tube 10' then is inserted through the hole 20' from the inside of the pipe until the lip 24' abuts against the area of the pipe around the hole, and an air bag 46' is inserted and inflated to press the joint surfaces together as the tube is bonded to the pipe.

In the embodiment shown in FIG. 2, the free end portion of the tube 10' does not have a belled portion, but rather is bonded to a plastic collar 52 having a threaded end portion 54 to which another section of conduit or the like can be threaded (see illustrations (*e'*) and (*f'*)). Herein, the collar 52 surrounds the tube 10' and one end abuts the rim 32' of the flange 22' and is bonded to the tube and flange by PVC solvent cement, the collar preferably being bonded simultaneously with the bonding of the tube to the pipe 12'.

The use of such a collar 52 has been found to be advantageous when the tube 10' is likely to be subjected to axial forces tending to push the tube into the pipe 12'. By way of example, conduits 14' of this type have been successfully used in watering systems for golf courses with sprinkler heads attached to the threaded collar. The collar 52 enables the conduit 14' to withstand the weight of a tractor or grass mower passing over the sprinkler, the collar transmitting the force exerted by the vehicle directly to the tube 10' and to the pipe 12' through the flange 22', thereby subjecting the bonded joints to only shear forces.

FIG. 3 illustrates, in diagrammatic form, the method in accordance with the invention used to form a "cross" branched conduit 14" wherein two tubes 10" are joined to opposite sides of the pipe 12", parts of this mode which correspond with parts described in connection with FIG. 1 being designated by corresponding double primed reference numerals. In this instance, each of the tubes 10" has a circular cross-section with an outside diameter substantially equal to that of the pipe 12", the pipe and tubes having belled end portions 18" to which additional conduit sections can be attached.

As shown in illustration (*a*) of FIG. 3, the pipe 12" initially is formed with two opposing holes 20" through the sides, the holes herein being axially aligned with each other and simultaneously formed by a suitable cutter 26." Each hole 20" is formed with a diameter substantially less than the diameter of the end portion of the tube 10" to be inserted therethrough, and after initially being formed, the holes are expanded incident to forming flanges 22" upstanding around the holes.

In illustration (*b*) of FIG. 3, the pipe is shown with the holes 20" expanded and the flanges 22" formed by softening the pipe 12" in a hot bath (not shown) and then using a mandril (also not shown) to raise the edges 32" of the holes 20" while enlarging the holes to diameters substantially equal to the outer diameters of the respective end portions of the tubes 10". Since the holes 20" herein are enlarged to have diameters equal to the outer diameter of the pipe 12" in which they are formed, the adjacent sidewall portions 13 of the pipe disposed between the holes must be stretched slightly, as best seen in illustration (*g*) of FIG. 3.

In a manner similar to that described in connection with FIG. 1, the tubes 10" are formed with notches, softened in a hot bath, and then are deformed and bonded to the pipe 12". One tube 10" is first heated and the notched end inserted into the hole 20", and an air bag 46" is inserted and inflated to deform the tube and form a lip 24" inside the pipe 12" around the hole 20". When the tube 10" is sufficiently cool, the air bag 46" is deflated and the tube is pushed inwardly to expose the lip 24" and the annular portion of the tube which will be bonded to the flange 22". A PVC solvent cement is applied to the exposed surfaces by brushing or spraying from the inside of the pipe, and the tube 10" then is repositioned and the bag 46" inflated while the bond cures, as seen in illustration (*d*).

After one tube 10" has been bonded to the pipe 12", the second tube is similarly joined by heating, deforming and then bonding, as shown in illustrations (*e*) and (*f*) of FIG. 3. Although the adjacent sidewall portions 13 of the pipe 12" disposed between the holes 20" were stretched, the lips 24" formed on the tubes 10" inside the pipe reinforce those areas and actually increase the strength of the pipe. Thus, the completed "cross" conduit 14" shown in illustration (*f*) provides joint surfaces which are exceptionally strong and resistant to internal fluid pressures which, as in the case of the "T" conduit 14 previously described, act radially to press the joint surfaces together.

From the foregoing, it will be appreciated that the method of the invention produces an extremely strong joint between the pipe and tube, whether used to make a "T" or a "cross" conduit. While the presently preferred method of the invention and variations thereof, have been illustrated and described, it should be apparent that various modifications and changes can be made without departing from the spirit and scope of the invention. It should be also apparent that the method can be successfully used for forming other branched conduit configurations wherein a tube is joined to the side of a pipe.

While the foregoing specifically suggests the softening of the plastic in a heated bath, other methods can be used. For example, a heated mandril can be used to form the flange around the hole in the pipe or, in the case of FIG. 2, to form the lip around the tube. Further, a suitable expanding mandril can be used in place of an inflatable air bag to deform the tube in the embodiments of FIGS. 1 and 3, or to press the joint surfaces together during bonding, although the use of an inflatable bag is preferred since it provides relatively uniform pressure over irregular contours.

I claim:

1. The method of joining a plastic tube to the side of a plastic pipe to make a branched conduit, said method comprising the steps of:
   forming a hole in the side of the pipe smaller than the size of the tube;
   softening the pipe around said hole;
   deforming the pipe outwardly around said hole to form an outwardly projecting flange, while expanding the hole to a size sufficient to receive the tube;
   softening one end portion of the tube to a temperature at which it is plastically deformable and inserting said one end portion into said hole;
   plastically deforming said one end portion into an enlarged lip abutting the inside of the pipe around said hole;
   hardening said one end in the deformed condition;
   applying a bonding material between the abutting portions of the tube and pipe;
   applying pressure to said abutting portions to press them firmly together during bonding; and
   relieving said pressure after the tube and pipe are bonded together.

2. The method as defined in claim 1 in which said one end portion of said tube is formed with V-shaped notches and is softened by immersing said one end portion into a heated fluid bath, and said deforming includes the steps of inserting an expandable gas bag into said pipe and then expanding said bag to apply pressure to said one end portion from inside said pipe.

3. The method as defined in claim 1 in which said plastic is polyvinyl chloride and said bonding material is a polyvinyl chloride solvent cement.

4. The method as defined in claim 1 in which said softening of said pipe and said softening of said one end portion of said tube each comprises immersing said pipe and said tube into a hot fluid bath.

5. The method as defined in claim 4 in which the fluid in said hot fluid bath is glycerine at a temperature of about 300° F. and said plastic tube and said plastic pipe are each made of polyvinyl chloride.

6. The method as defined in claim 1 in which said plastic tube and said plastic pipe are composed of a thermoplastic resin and said tube and pipe are each softened by heating.

7. The method as defined in claim 1 further including joining a second plastic tube to the side of said pipe to form a "cross" conduit by the steps of forming a second hole in the side of said pipe opposite said first hole and smaller than the size of said second tube; forming an upstanding flange around said second hole while enlarging said hole to a size sufficient to receive said second tube; deforming one end portion of said second tube to define a lip having a contour matching that of the inside of said pipe around said second hole; positioning the lip of said second tube into engagement around said second hole with said second tube projecting outwardly through the flange; and bonding the flange to said second tube and the lip to said pipe.

8. The method of making a branch connection in a plastic conduit comprising the steps of:
   forming a tubular plastic branch with a pair of diametrically opposed V-shaped notches in one end;
   forming a hole in the side of the conduit smaller than the outer dimensions of said one end of said branch;
   plastically deforming the conduit to enlarge said hole to substantially the same size as said one end of said branch, while forming an outwardly projecting flange around said hole;
   inserting said one end of said branch into said hole with said V-shaped notches spaced apart longitudinally of the conduit and with said flange engaged around said branch;
   plastically deforming said one end portion to define a lip abutting the inside of the conduit around said hole and conforming to the contour thereof; and
   bonding said lip to the conduit and said flange to said branch.

9. The method as defined in claim 8 in which said conduit is deformed by heating the area around said hole to a temperature at which the plastic of the conduit becomes soft, and raising the edge of said hole while enlarging the size thereof, and then cooling said conduit until said flange is hardened.

10. The method as defined in claim 9 in which said one end portion is deformed by heating said one end portion to a temperature at which the plastic of said branch becomes soft, and then applying pressure to said end portion to flair the edge thereof outwardly and into engagement with the inside of said pipe around said hole.

11. The method as defined in claim 10 in which said branch and said conduit are composed of polyvinyl chloride and said bonding comprises applying a polyvinyl chloride solvent cement between said lip and said conduit and between said flange and said branch.

12. The method as defined in claim 8 further including the step of bonding a threaded tubular sleeve around said branch and to the edge of said flange.

13. The method as defined in claim 8 in which said branch and said conduit are each circular in cross-section and said branch has an outer diameter less than that of said conduit.

14. The method as defined in claim 8 in which said branch and said conduit are circular in cross-section and each has substantially the same outside diameter.

15. The method of joining a plastic tube to the side of a plastic pipe to make a branched conduit, said method comprising the steps of:
   forming a hole in the side of the pipe with an outwardly projecting flange therearound, said hole having a size sufficient to receive the tube;
   deforming one end portion of the tube to define a lip having a contour matching that of the inside of the pipe around said hole;
   applying a bonding material around the tube in the area of said lip;
   positioning said lip in engagement around the inside of said hole with the tube projecting outwardly through said flange;
   applying internal pressure to force said lip against the pipe in the area of contact; and
   bonding the outer surface of said lip to the inner surface of the pipe and the inner surface of said flange to the outer surface of the tube whereby fluid pressure within said branched conduit presses said lip against the inside of the pipe and acts to hold the branched conduit together.

16. The method as defined in claim 15 in which said tube has a length substantially less than the maximum inside dimension of said pipe and said lip is formed prior to positioning said lip into engagement around said hole.

17. The method as defined in claim 16 in which said lip is formed by softening said one end portion and applying pressure to said one end portion to flair the edge thereof laterally of said tube.

18. The method as defined in claim 16 in which said tube and said pipe are each formed of a thermoplastic resin and said bonding comprises applying a thermoplastic resin solvent cement between said flange and tube, and said lip and pipe.

19. The method as defined in claim 15 in which said lip is formed by softening said one end portion, inserting said one end portion through said flange into said hole, and deforming said one end portion into engagement with the inside of said pipe around said hole.

20. The method as defined in claim 19 wherein V-shaped notches are formed in said one end of said tube, and in which said tube and said pipe are each formed of a thermoplastic resin, and said bonding comprises applying a thermoplastic resin solvent cement between said flange and tube, and said lip and pipe.

21. The method as defined in claim 19 in which said hole is formed to a size sufficient to receive said tube by forming a first hole smaller than the size of the tube and expanding said first hole an incident to forming said flange.

22. The method as defined in claim 21 in which said first hole is expanded by heating the pipe in the area of said hole to a temperature at which the pipe is soft, inserting an expandable, cylindrical mandril through said hole, and expanding said mandril to a diameter substantially equal to the tube, and withdrawing said expanded mandril outwardly of said hole thereby raising the edge of said hole to form said flange and expand said hole to the diameter of said mandril.

References Cited
UNITED STATES PATENTS

| | | | |
|---|---|---|---|
| 3,654,008 | 4/1972 | Rogers et al. | 156—152 |
| 2,297,013 | 9/1942 | Nichols et al. | 285—156 X |
| 3,232,645 | 2/1966 | Bucks | 285—156 |

DOUGLAS J. DRUMMOND, Primary Examiner

M. G. WITYSHYN, Assistant Examiner

U.S. Cl. X.R.

156—211, 256, 293